United States Patent
Bumstead et al.

(10) Patent No.: US 9,787,607 B2
(45) Date of Patent: Oct. 10, 2017

(54) END-TO-END PROVISIONING OF ETHERNET VIRTUAL CIRCUITS

(75) Inventors: David Bumstead, San Jose, CA (US); Sharfuddin Syed, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 942 days.

(21) Appl. No.: 13/079,021

(22) Filed: Apr. 4, 2011

(65) Prior Publication Data

US 2012/0254376 A1 Oct. 4, 2012

(51) Int. Cl.
*G06F 15/173* (2006.01)
*H04L 12/931* (2013.01)
*H04L 12/24* (2006.01)
*H04L 12/937* (2013.01)

(52) U.S. Cl.
CPC ........ *H04L 49/351* (2013.01); *H04L 41/0806* (2013.01); *H04L 49/253* (2013.01)

(58) Field of Classification Search
CPC .......................... H04L 49/253; H04L 41/0806
USPC .......................................................... 709/224
See application file for complete search history.

(56) References Cited

U.S. PATENT DOCUMENTS

| | | | |
|---|---|---|---|
| 6,940,858 B1 * | 9/2005 | Hunlich | H04L 45/00 370/352 |
| 7,136,374 B1 * | 11/2006 | Kompella | H04L 45/10 370/352 |
| 7,606,939 B1 * | 10/2009 | Finn | H04L 12/4645 709/246 |
| 2003/0131131 A1 * | 7/2003 | Yamada | H04L 12/4675 709/238 |
| 2004/0081171 A1 * | 4/2004 | Finn | H04L 12/462 370/395.53 |
| 2004/0119814 A1 * | 6/2004 | Clisham | H04N 7/141 348/14.08 |
| 2005/0099949 A1 * | 5/2005 | Mohan | H04L 47/10 370/236.2 |
| 2005/0220119 A1 * | 10/2005 | Rajsic | H04L 12/5601 370/395.52 |
| 2005/0281392 A1 * | 12/2005 | Weeks | H04L 12/2697 379/22 |
| 2008/0181110 A1 * | 7/2008 | Ramakrishnan | H04L 41/0896 370/232 |
| 2009/0122718 A1 * | 5/2009 | Klessig | H04L 12/462 370/254 |
| 2009/0161533 A1 * | 6/2009 | Ballantyne | H04L 41/06 370/218 |
| 2009/0163217 A1 * | 6/2009 | Xu | H04W 76/02 455/450 |
| 2010/0074098 A1 * | 3/2010 | Zeng | H04L 12/44 370/217 |

(Continued)

*Primary Examiner* — Karen Tang

(74) *Attorney, Agent, or Firm* — David L. Soltz

(57) ABSTRACT

Methods and systems are disclosed for providing a signaling protocol to enable a bi-directional point-to-point Ethernet Virtual Circuits (EVC) to be configured between any two network elements, as part of a network infrastructure. The bi-directional EVC is established by configuration of a source network element and a destination network element, and defines a bi-directional data path across the network infrastructure therebetween. The EVC may include one or more network elements over which the data path may traverse. The methods and systems disclosed may be applied to linear, ring and mesh network topologies.

29 Claims, 8 Drawing Sheets

(56) References Cited

U.S. PATENT DOCUMENTS

| | | | | |
|---|---|---|---|---|
| 2010/0111086 A1* | 5/2010 | Tremblay | ............... | H04L 12/18 370/390 |
| 2010/0208706 A1* | 8/2010 | Hirano | ............... | H04W 60/005 370/332 |
| 2011/0051689 A1* | 3/2011 | Premec | ............... | H04W 8/087 370/331 |
| 2011/0161500 A1* | 6/2011 | Yengalasetti | ...... | H04N 21/6437 709/227 |
| 2011/0302496 A1* | 12/2011 | Pugaczewski | ......... | H04L 12/24 715/735 |
| 2012/0210416 A1* | 8/2012 | Mihelich | ............ | H04L 63/0218 726/11 |

\* cited by examiner

END-TO-END PROVISIONING OF ETHERNET VIRTUAL CIRCUITS

BACKGROUND OF THE INVENTION

Description of the Related Art

The present invention relates generally to network management and more particularly, to management of interconnections between multiple network elements within a network infrastructure in the creation of Ethernet Virtual Circuits.

In telecommunications, an Ethernet Virtual Circuit (EVC) provides point-to-point connectivity between two access points across a network infrastructure, a first access point associated with a first network element and a second access point associated with a second network element, for example. Once the EVC is established between a source network element and a destination network element, data traffic may be delivered across the EVC, in the form of a bit stream for example.

The Open Systems Interconnection model (OSI model) describes a communications system for communicating over a network infrastructure. The OSI model divides the communications system into multiple layers, currently seven layers, each layer including functions that typically provide services to adjacent layers. While many protocols exist for establishing an EVC across a network infrastructure, such protocols often overate at higher levels in the Open Systems Interconnection model (OSI model) to avoid dealing with the division of the data traffic into segments, packets, or frames during propagation of the data traffic through a network infrastructure. For example, most protocols which may establish an EVC operate at layer 3 of the OSI model, or network layer, or above. One such protocol is the Resource Reservation Protocol (RSVP), which operates on the transport layer of the OSI model. The RSVP generally defines data traffic flow from a sender network element to a receiver network element. Thus, establishing a bi-directional connection between two network elements is a two-stage process. In the first process stage, a first unidirectional connection is established from a first network element to a second network element, and in the second process stage a second unidirectional connection is established between the second network element and the first network element. This two-stage process typically results in a more complex, and potentially more costly, EVC.

Another protocol which may be used to establish EVCs is the Label Distribution Protocol (LDP). Generally, the LDP utilizes labels in Ethernet frames for the purposes of routing data traffic. While LDP utilizes aspects of the link layer, the LDP relies on underlying protocols, e.g., Transmission Control Protocol (TCP), which operate on higher levels of the OSI model, TCP operating on the transport layer, layer 4. As with RSVP, utilization of additional resources generally results in a more complex system which, in turn, may often lead to increased operating costs, both in hardware needed to support such additional resources as well as power costs associated with the additional hardware.

Other problems associated with establishment of EVCs include scalability, survivability, and bandwidth management. As the number of established EVCs in a network infrastructure increases, the corresponding resources required to support the EVCs may increase, as well. Such resources may includes, for example, computing power, network bandwidth, etc. In more complex communication systems, which may require communications over multiple layers of the OSI model for example, increased use of these resources may result in increased costs in operation of the EVCs.

Survivability is another problem associated with establishment of EVCs. After an established EVC fails, transmission of data traffic associated with the failed EVC is stopped until the EVC is re-established. Thus, the time required to re-established an EVC after a failure, such as a network element failure or a link failure between adjacent network elements, may be undesirably long. Long delays associated with re-establishing the EVC result in delayed transmission of data traffic associated with the failed EVC.

Another problem associated with establishment of EVCs is bandwidth management. As an EVC is established over a network infrastructure the EVC consumes bandwidth associated with the network elements of the EVC. With multiple EVCs established across multiple network elements, the bandwidth associated with certain ones of the network elements may be restricted with respect to one or more EVCs. Thus, while a particular EVC may require a certain bandwidth associated with transmission of its data traffic, one or more network elements of the particular EVC may not be able to provide the required bandwidth, resulting in delayed delivery of the data traffic, or errors associated with the delivery of the data traffic.

There is a need for mechanisms to establish point-to-point bi-directional Ethernet Virtual Circuits which may utilize a single layer of the OSI model, resulting in less complex EVC systems, leading to lower operating costs. There is also need to provide such point-to-point bi-directional Ethernet Virtual Circuits which offer scalability in the number of established EVCs in light of available resources. Further, there is a need to re-establish such point-to-point bi-directional Ethernet Virtual Circuits in a timely manner upon failures, providing the rapid release of resources associated with the EVC and the rapid re-establishment of the EVC. Also, there is a need to provide bandwidth management of such point-to-point bi-directional Ethernet virtual Circuits, such an EVC is established without exceeding the transmission capacity of associated links between adjacent network elements.

SUMMARY OF THE INVENTION

Consistent with the present disclosure, methods and systems are disclosed for enabling bi-directional point-to-point Ethernet Virtual Circuits (EVCs) to be configured between any two network elements, as part of a network infrastructure. In one aspect of the embodiments of the disclosure, a plurality of network elements are provided, each with a set of attributes. The plurality of network elements may form a network having a linear topology, a ring topology, or a mesh topology. A first set of attributes of a first of the plurality of network elements and a second set of attributes of a second of the plurality of network elements being indicative of a connection, e.g. an EVC, between the first and second of the plurality of network elements. A first message including an identifier of the second of the plurality of network elements may be transmitted in accordance with an Ethernet protocol from the first of the plurality of network elements, through each of remaining ones of the plurality of network elements, to the second of the plurality of network elements. Once received by the second of the plurality of network elements, the first message may be compared to certain of the set of attributes of the second of the plurality of network elements. Upon confirmation that the second of the plurality of network elements is a destination network element of the connection, the second of the plurality of network elements transmits a second message. The second message is transmitted in accordance with the Ethernet protocol from the second of the plurality of network elements, through the remaining ones of the plurality of network elements, to the first of the plurality of network elements. The second message may be indicative of the connection being established between the first and second of the plurality of network elements.

In certain embodiments, the set of attributes of each of the plurality of network elements may include a respective one of a plurality of network element identifiers. The set of attributes may further include network element identifiers of other of the plurality of network elements. In other embodiments, the first of the plurality of network elements includes a first access port configured to communicate with a first client network element and the second of the plurality of network elements includes a second access port configured to communication with a second client network element, the connection terminating at the first and second access ports. The set of attributes of the first and second of the plurality of network elements may include one or more attributes from a group consisting of: a connection identifier, a first shelf identifier which identifies the shelf of the first access port, a first slot identifier which identifies the slot of the first access port, a first port identifier which identifies the first access port, and bandwidth parameters. The attributes of the first of the plurality of network elements may include attributes associated with the second of the plurality of network elements. Attributes associated with the second of the plurality of network elements may include a network element identifier of the second of the plurality of network elements, a second shelf identifier which identifies the shelf of the second access port, a second slot identifier which identifies the slot of the second access port, and a second port identifier which identifies the second access port. The bandwidth parameters may include one or more of a value indicating a Class of Service, a Committed Information Rate (CIR), a Committed Burst Size (CBS), an Excess Information Rate (EIR), and an Excess Burst Size (EBS).

It is to be understood that both the foregoing general description and the following detailed description are exemplary and explanatory only and are not restrictive of the invention, as claimed. Other objects, features and advantages of the embodiments disclosed or contemplated herein will be apparent from the drawings, and from the detailed description that follows below.

BRIEF DESCRIPTION OF THE DRAWINGS

Reference will be made to embodiments of the disclosure, examples of which may be illustrated in the accompanying figures. These figures are intended to be illustrative, not limiting. Although certain aspects of the embodiments are generally described in the context of these embodiments, it should be understood that it is not intended to limit the scope to these particular embodiments. In the drawings wherein like reference symbols refer to like parts.

DETAILED DESCRIPTION OF THE INVENTION

Methods and systems are disclosed for enabling a bi-directional point-to-point Ethernet Virtual Circuits (EVC) to be configured between any two network elements, as part of a network infrastructure. An EVC is established through configuration of a source network element and a destination network element with certain attributes indicative of the EVC, and communication of control messages there between to establish the EVC. Additional network elements along the proposed EVC path between the source and destination network elements are configured to quickly communicate control messages between adjacent network elements in the establishment of the EVC, while also defining port and S-VLAN designations. The control messages used are preferably transmitted in accordance with an Ethernet protocol on a single layer of the OSI model. Accordingly, the established EVC does not rely on multiple layers of underlying protocols, e.g., as the Label Distribution Protocol (LDP) relies on Transmission Control Protocol (TCP), which otherwise increase operating costs and complexity. Thus, an EVC provided in accordance with this disclosure is less complex, providing simpler configuration, management, and provisioning, which may further result in decreased operating costs.

The following description is set forth for purpose of explanation in order to provide an understanding of the invention. However, it is apparent that one skilled in the art will recognize that embodiments of the present invention, some of which are described below, may be incorporated into a number of different systems and devices.

The embodiments of the present invention may include certain aspects each of which may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, signals transmitted between these components may be modified, re-formatted or otherwise changed by intermediary components.

While various portions of the present disclosure are described relative to specific structures with respect to a photonic integrated circuit using specific labels, such a "transmitter" or "receiver", these labels are not meant to be limiting.

Reference will now be made in detail to the present exemplary embodiments, which are illustrated in the accompanying drawings.

Figure 1:
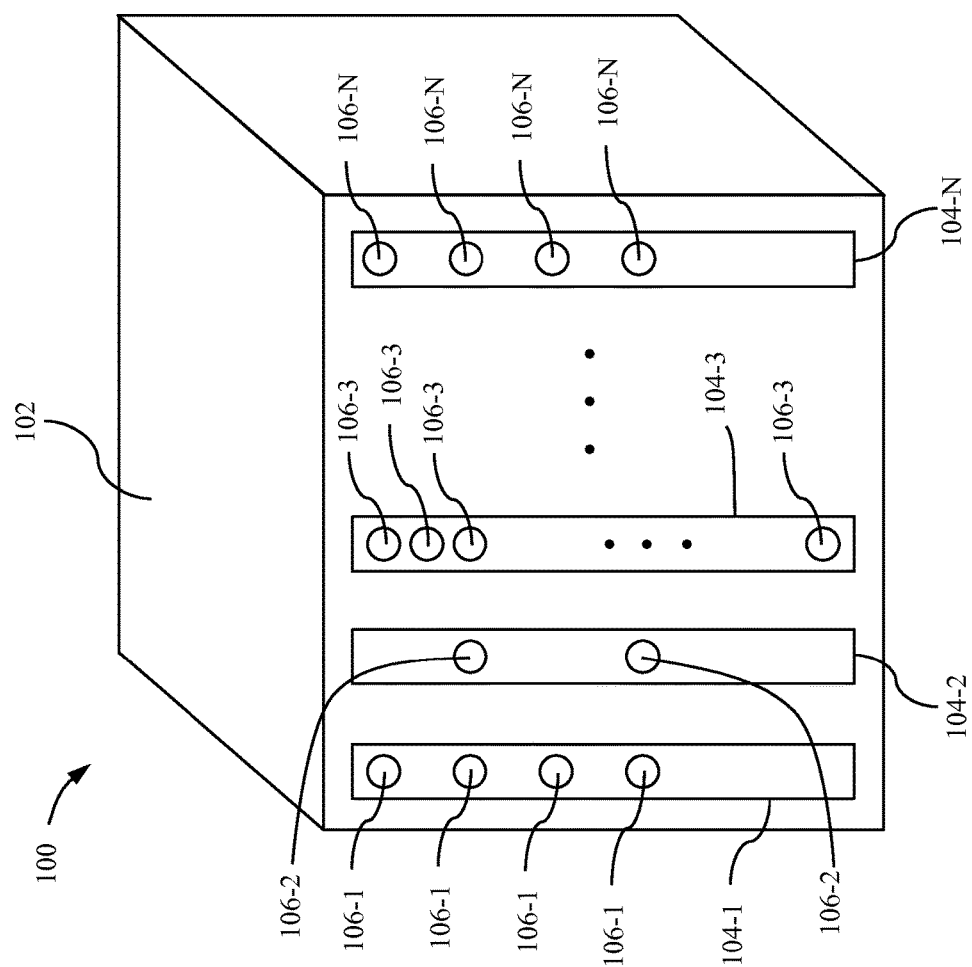
FIG. 1 is an exemplary network element, in accordance with certain aspects of this disclosure.

FIG. 1 illustrates an exemplary network element 100, including a chassis 102 and a number of line cards 104. For purposes herein, a network element may include a manageable device which has one or more chassis having switching functionality, for example, being able to selectively direct network traffic received on one port to one or more other ports for transmission over a network infrastructure. Typically, each line card 104 may contain one or more ports 106 on which network traffic is received and/or transmitted, from other network elements as part of the network infrastructure for example. The network traffic may be in the form of either an optical signal or an electrical signal. Each of the line cards 104 may be configured to have the same or differing numbers of ports 106. Certain of the ports 106 may be used to communicate with other network elements 100 in a network infrastructure, while other ports 106 may be used to communicate with client equipment to function as a data ingress point or a data egress point with respect to the network infrastructure.

As shown in FIG. 1, the network element 100 includes a number of line cards 104-1 through 104-N, collectively referred to as line cards 104. Each of the line cards 104 includes a number of ports 106, such that a first line card 104-1 includes ports 106-1 and an N line card 104-N includes ports 106-N. Ports 106-1 through 106-N of each line card 104-1 through 104-N, respectively, may be collectively referred to as ports 106. As shown, the first line card 104-1 may include four ports identified as ports 106-1, and a second line card 104-2 may includes two ports 106-2. Also, a third line card 104-3 may include sixteen ports, although only four are shown for purposes of simplicity, and an $N^{th}$ card 104-N may include four ports 106-N, similar to the first line card 104-1. The different number of ports 106 per each of the cards 104 is for illustration purposes only, and some cards 106 may have additional or fewer ports than depicted. Chassis 102 may also include other cards (not shown) which are utilized to perform certain system functions and, therefore, may not include a network port 106.

The network element 100 of FIG. 1 may include an interconnect switch (not shown), described in greater detail with reference to FIG. 2 below, which provides the communication paths between the various ports 106 of the installed line cards 104. Some communication paths may be provided on a single line card 104, between a first port 106 and a second port 106 of the line card 104 for example. Other communication paths may be provided across multiple cards 104, from one port 106 on a first card 106 to another port 106 on a second card 104, through the use of a backplane interface (not shown) for example. As should be readily understood, such communication paths can be provided between numerous networking systems, such as network element 100, as part of a network infrastructure.

Figure 2:
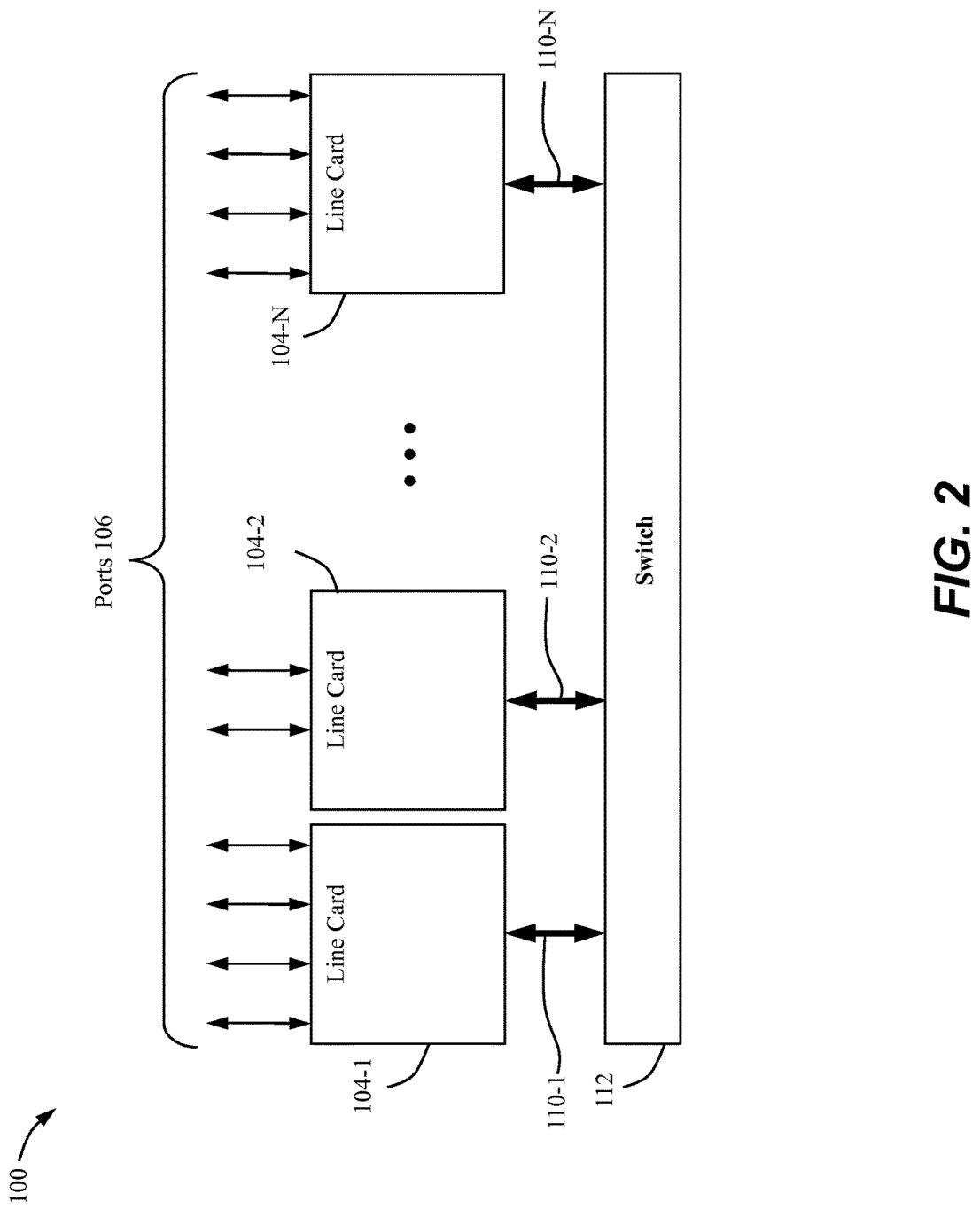
FIG. 2 depicts certain details of the exemplary network element of FIG. 1.

Turning to FIG. 2, a more detailed view of an exemplary network element 100 includes interconnects 110 between the line cards 104 and a switch 112. Switch 112 may be utilized to direct data traffic received on one port 106 of a first line card 104 to another port 106 of a second line card 104. The switch 112 may be part of a backplane to provide the interconnectivity between each of the ports 106 of each of the line cards 104. The switch 112 may include, but is not limited to, simple busses, point-to-point links, circuit switches, cell or packet switches, or other similar structures. Switch 112 preferably includes one or more Ethernet switches, e.g. layer 2 switches, which act to switch data traffic, such that data traffic from a port 106 of one of the line cards 104 is directed to a port 106 of the same or another of the line cards 104. Switch 112 may support various types of traffic flows such as unicast traffic, bicast traffic, multicast traffic, and broadcast traffic. It is noted that the network element 100 may also include additional line cards 104 which interface with the network infrastructure, but are not shown for purposes of simplicity. Therefore, data traffic entering the network element 100 from the network infrastructure on one port may be redirected out another port of the same, or another line card 104, back onto the network infrastructure.

Figure 3A:
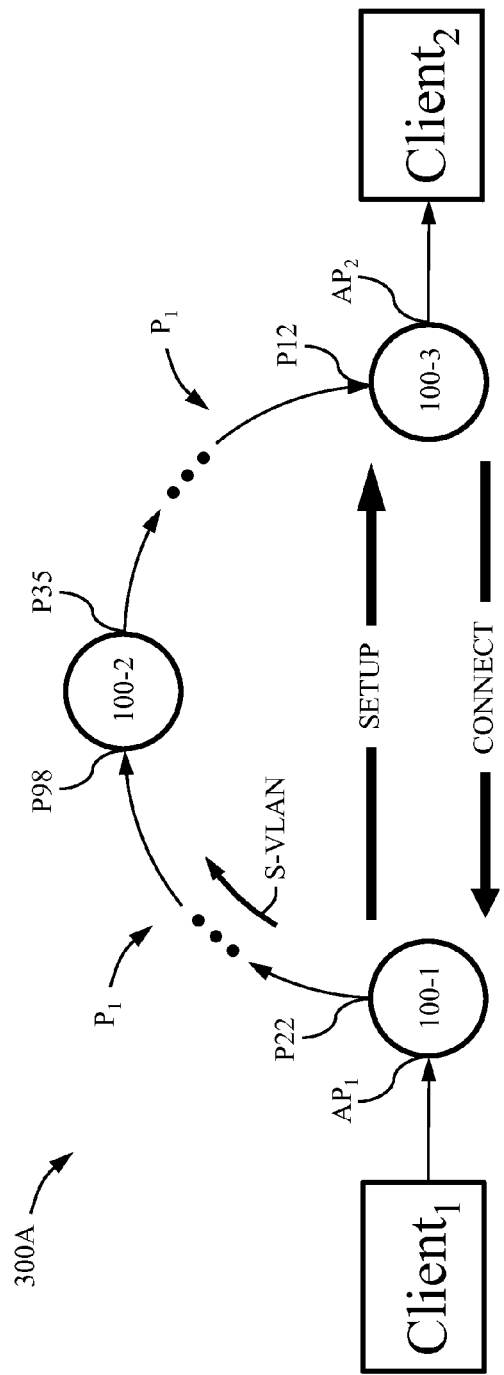
FIG. 3A depicts a network infrastructure, in accordance with certain aspects of this disclosure.

Turning to FIG. 3A, a network infrastructure 300A, consistent with various aspects of this disclosure, includes first and second client network elements, identified as $Client_1$ and $Client_2$, as well as network elements 100-1, 100-2, 100-3. Network element 100-1 may also be referred to as source network element 100-1, and network element 100-3 may also be referred to as destination network element 100-3. For illustration purposes, only one network element 100-2 is depicted between network element 100-1 and network element 100-3, however, network infrastructure 300A may include additional network elements similar to network element 100-2 along path $P_1$. Source network element 100-1, network element 100-2, and destination element 100-3, are collectively referred to as network elements 100.

In accordance with this disclosure, the network elements 100 are connected in a simple linear fashion, from the source network element 100-1 to the destination network element 100-3 along the path $P_1$. The network elements 100 are configured to communicate with adjacent network elements 100 to establish point-to-point bi-directional EVCs. The EVCs provide communication connections between client equipment, such as the client network elements $Client_1$, $Client_2$. Data traffic may be provided by first client network element $Client_1$ to the EVC source network element 100-1 via a first access port, shown as $AP_1$. The data traffic may then propagate through the network 300A on the EVC extending from the source network element 100-1 to the destination network element 100-3. The data traffic may then be provided from the destination network element 100-3 to a second client network element $Client_2$ via a second access port, shown as $AP_2$. Communication over the network infrastructure 300A may be achieved through the use of a provisioning message scheme, as described in greater detail below. The provisioning message scheme enables communication over the network infrastructure 300A between ports 106 of one network element 100 and ports 106 of adjacent network element(s) 100. Such provisioning messages may, for example, identify certain attributes of the source and destination network elements 100-1, 100-3, e.g., the end network elements, of the EVC, and establish a corresponding EVC therebetween.

Prior to establishing the EVC, the network elements 100, as part of the network infrastructure 300A, are discovered, through various techniques known in the art. The discovery process results in the acquisition of an ordered list of attributes identifying certain characteristics of each of the network elements 100. Attributes of each of the network element 100 may include a unique identifier which identifies the network element in the network infrastructure 300A. The unique identifier may be provided in any suitable form, such as, for example, a number representative of an internet protocol (IP) address, or other unique number assigned by the network administrator. Other attributes associated with each of the network elements 100 may include port information related to the various ports 106 of each of the network elements 100, including shelf number and slot number of the port 106, if applicable. More specifically, attributes of each of the network elements 100 may include a data structure identifying communication links associated with ports 106 of adjacent network elements. For example, the source network element 100-1 may include first ports 106-1 and network element 100-2 adjacent to the source network element 100-1 may include second ports 106-2. The discovery process would result in identifying which ports 106-1 on the source network element 100-1 connect to which ports 106-2 of the adjacent network element 100-2. The data structure information is shared between each of the network elements 100 of the network infrastructure 300A such that each of the network elements 100 becomes aware of the connectivity of each port 106 of each network element 100. Thus, network element 100-2 would be discovered between the source network element 100-1 and the destination network element 100-3, along the path $P_1$. More specifically, path $P_1$ may extend from a port 22 of the source network element 100-1, identified as P22, to a port 98 of the network element 100-2, identified as P98, along a first portion of the path $P_1$. The path $P_1$ may then extend from a port 35 of the network element 100-2, identified as P35, to a port 12 of the destination network element 100-3, identified as P12, along a second portion of the path $P_1$. It is noted that the port numbers described here are for illustration purposes only and may be programmed, or otherwise established, automatically or manual by a network administrator.

With the attributes obtained from the discovery process, each of the network elements 100 becomes aware of the attributes of the other ones of the network elements 100 of the network infrastructure 300A. To transfer data from the client network element $Client_1$ to the Client network element $Client_2$, for example, an EVC can be established between the source network element 100-1 and the destination network element 100-3. The source and destination network elements 100-1, 100-3 may be configured with additional attributes which define an EVC therebetween. Further attributes of the destination network element 100-3 may include attributes as defined in Table 1 below.

TABLE 1

Destination Network Element Attributes

Destination Network Element ID
Destination Connection ID
Destination Shelf Number
Destination Slot Number
Destination Port Number
Destination Access Port Information
Bandwidth Information A destination network element 100-3 ID is a unique identifier for the network element 100-3 within network infrastructure 300A. A destination connection ID provides a unique identifier of the EVC being established, and is stored in the destination network element 100-3. The destination connection ID may be used to identify other attributes associated with a particular EVC, as described in greater detail with respect to FIG. 4A below. Destination access port 106 information associated with the destination network element 100-3 may also be provided, the port 106 number identifying the port connecting the client network element $Client_2$ to the destination network element 100-3. The access port 106 information may also include unique customer VLAN designations identifying the EVC on the access port. Such customer VLAN identifiers may be used to ensure that Ethernet data traffic flows of one EVC associated with the access port do not interfere with other Ethernet data traffic flows of other EVCs associated with the same access port. If applicable, shelf information may be used to identify a shelf number in which the port 106 of network element 100-3 is located, and slot information may be used to define the slot number in which the port 106 of network element 100-3 is located, e.g., of a chassis (not shown) associated with the port. The attributes may also include access port information which describes which access port, e.g. port $AP_2$, connects to the client network element $Client_2$. Such access port information may include the corresponding shelf and slot numbers associated with the access port $AP_2$. The attributes of the destination network element 100-3 may also include bandwidth information, such as, for example, a service category, as well as known bandwidth profile parameters Committed Information Rate (CIR), Committed Burst Size (CBS), Excess Information Rate (EIR), and Excess Burst Size (EBS). Such bandwidth information may be utilized in establishing the EVC, ensuring that the bandwidth of the client network element $Client_2$ is not exceeded for example. The source network element 100-1 includes similar attributes as described above with respect to the destination network element 100-3, and certain attributes which identify the destination network element 100-3, with respect to a desired EVC. Table 2 below lists exemplary attributes of the source network element 100-1.

TABLE 2

Source Network Element Attributes

Source Network Element ID
Source Connection ID
Source Shelf Number
Source Slot Number
Source Port Number
Source Access Port Information
Bandwidth Information
Destination Network Element ID
Destination Shelf
Destination Slot
Destination Port
Destination Connection ID The source network element 100-1 ID is a unique identifier of the network element 100-1 of the network infrastructure 300A. The source connection ID, as with the destination connection ID, provides a unique identifier for the EVC to be created. The source connection ID may be the same or different from the destination connection ID, however each, in conjunction with their respective network element IDs, is a unique identifier for the EVC. The source port, shelf, and slot numbers are similar to those described with respect to the destination network element 100-3. The source port information describes the access port, e.g. $AP_1$, which provides connectivity between the source network element 100-1 and the client network element $Client_1$. Such access port information may include the corresponding shelf and slot numbers associated with the access port $AP_1$. The bandwidth information may be similar to the bandwidth information of Table 1, as described above. The source network element 100-1 attributes of Table 2 also includes information regarding the destination network element 100-3. As depicted in Table 2, such information may include the destination network element ID, port, shelf, and slot numbers, and destination connection ID.

As described in greater detail below with respect to FIG. 4A, after the source and destination network elements 100-1, 100-3 are configured with information defining an EVC therebetween, an ordered list or route list identifying links along path $P_1$ may be generated by the source network element 100-1. The route list may include, for example, each network element 100 and corresponding ports 106 over which the EVC will traverse. If available and applicable, the route list may also include additional information such as the shelf number and the slot number of the various ports of interest.

In establishing the EVC, the source network element 100-1 generates and sends a SETUP message or protocol data unit (PDU), which includes the route list of the EVC, toward the destination network element 100-3, identified generally as the SETUP arrow in FIG. 3A. For example, the route list initially points to the first network element 100 downstream from the source network element 100-1, network element 100-2. The SETUP message also includes attributes related to the EVC between source network element 100-1 and destination network element 100-3, as defined in Table 2 above. For example, the STEUP message may include bandwidth information, as described above. Thus, if the requested CIR is not available at any network element along an EVC path, as identified in the route list, e.g., at one or more of the network elements 100 which include add/drop functionality or additional EVCs are already present, the establishment of an EVC may fail due to insufficient bandwidth. It is noted that the bandwidth of an established EVC may be asymmetrical, having a first bandwidth associated with data traffic propagating through the EVC in a first direction and a second bandwidth different from the first bandwidth, associated with data traffic propagating through the EVC in a second direction.

The SETUP message is transmitted from the source network element 100-1 along path $P_1$ toward network element 100-2 using the Ethernet protocol, preferably transmitted on a single layer of the OSI model. Since the Ethernet protocol is used for the transmissions related to establishing the EVC, an acknowledgement process must be utilized to ensure that the propagating SETUP message, as well as CONNECT and RELEASE messages discussed in greater detail below, is received. The acknowledgement system is discussed in greater detail with reference to FIG. 4C below.

The SETUP message is received by the network element 100-2 which immediately determines from the destination information that it is not the destination network element for the EVC from the attributes related to the EVC and forwards the SETUP message to the next network element in the route list, network element 100-3. As discussed in greater detail below with respect to FIG. 4A, each network element 100 which receives the SETUP message, records the interface ports 106 on which the SETUP message was received and transmitted, for example in a database. The access key to this database is the source network element 100-1 and the source connection ID, contained in the SETUP message. This port 106 database information is subsequently used to route CONNECT and RELEASE messages, as described below in greater detail with respect to FIG. 4A. Once the SETUP message is received and the destination network element 100-3 is confirmed as the destination element of the current EVC, the network element 100-3 responds with a CONNECT response, as depicted by the CONNECT arrow and physically connects the client network element Client$_2$ to the EVC. The CONNECT response travels back through the network 300 to the source network element 100-1 along corresponding path $P_1$, passing through the network element 100-2 along the way. Each network element 100 forwards the CONNECT message, using the aforementioned database information.

The SETUP message, as well as other communications between the various network elements 100, includes a Service Virtual Local Area Network (S-VLAN) ID, as generally indicated by arrow S-VLAN of FIG. 3A. As specified in IEEE Standard 802.1ad, S-VLAN is a 12-Bit number which may be used to identify the EVC within the network infrastructures, such as network infrastructure 300A. The 12-Bit number of the S-VLAN results in a limit of 4096 unique identifiers, and thus limits the maximum number of EVCs in the network, such as network infrastructure 300A for example, to 4096. To overcome this limitation, each network element 100 of an EVC may negotiate, or otherwise establish, a new S-VLAN ID for each link between adjacent network elements 100. For example, a first unique S-VLAN ID may be associated with the SETUP message as it propagates from the source network element 100-1 to the network element 100-2, and a second unique S-VLAN ID may be associated with the SETUP message as it propagates from the network element 100-2 to the destination network element 100-3. S-VLAN information can also be stored in the network elements 100, as part of the attributes list associated with an EVC. Thus, S-VLANs can be established and associated along each link of the path $P_1$. It is noted that the various messages described herein, e.g., SETUP, CONNECT, and RELEASE messages, as well as certain acknowledgement messages described in greater detail with reference to FIG. 4B below, may utilize a specific reserved S-VLAN designation for transmission. In such a configuration, data traffic associated with the EVC may propagate through the network infrastructure 300A associated with certain S-VLAN designations, while the connection control messages, e.g., SETUP, CONNECT, RELEASE, etc., may propagate through the network infrastructure 300A associated with the reserved S-VLAN designation.

It is noted that such access points $AP_1$, $AP_2$ may not necessarily lead to client network elements, such as Client$_1$, Client$_2$. Rather, such access points $AP_1$, $AP_2$ may interface the EVC between one of the client network elements, Client$_1$, Client$_2$, and another network, or two distinct networks.

Figure 3B:
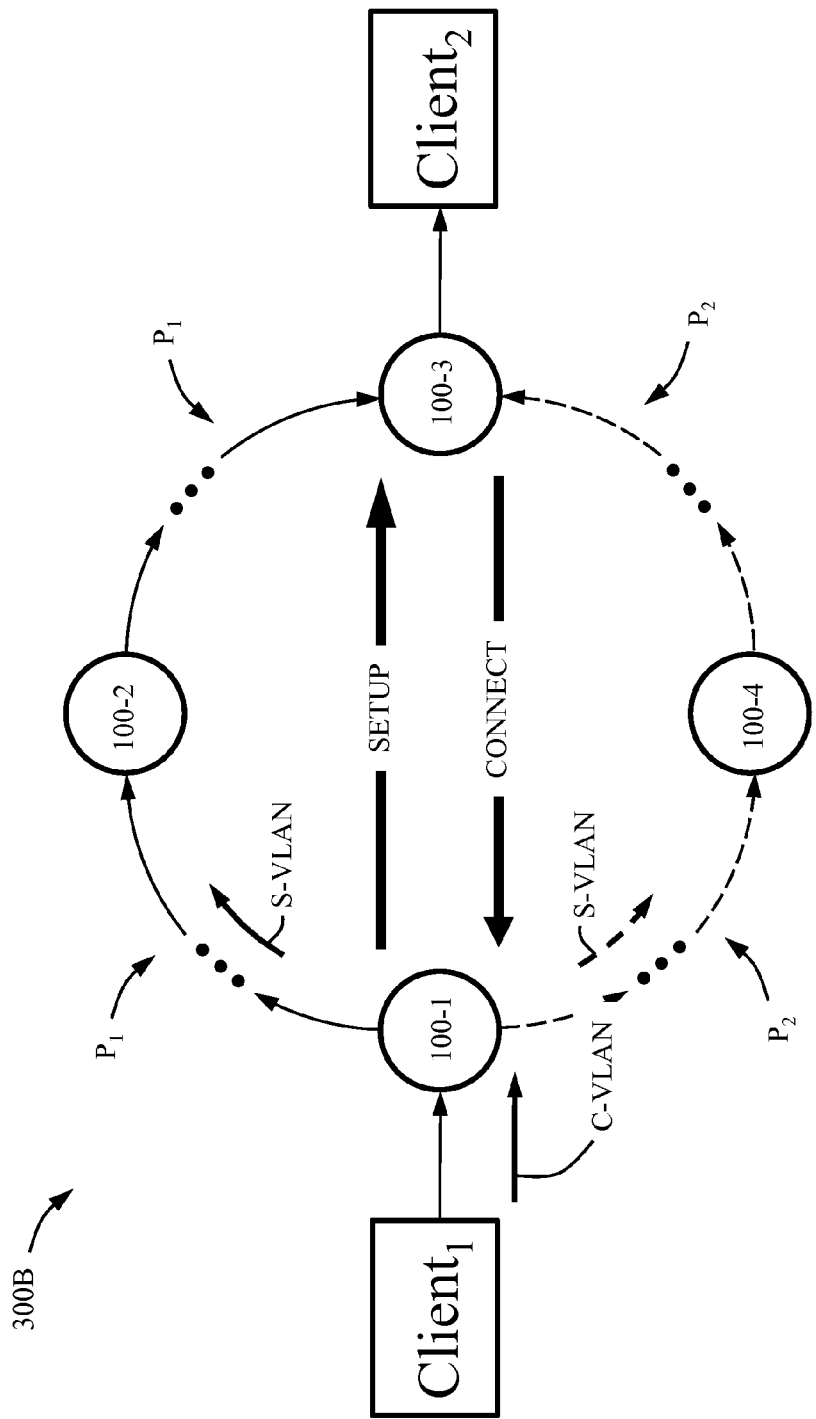
FIG. 3B depicts another network infrastructure, in accordance with certain aspects of this disclosure.

Turning to FIG. 3B, a network 300B is illustrated which is similar to network 300A. Network 300B, however, includes a second path, e.g. $P_2$, from source network element 100-1 to the destination network element 100-3 is depicted. The second path $P_2$ starts at the source network element 100-1 and passes through a network element 100-4, prior to finally reaching destination network element 100-3, path $P_2$ shown in dashed-line. With the ring network 300B of FIG. 3B, it is noted that the establishment of the EVC between the source network element 100-1 and the destination network element 100-3 can be initiated along path $P_1$ to network element 100-2 or along path $P_2$ toward network element 100-4. With the SETUP message provided along path $P_2$ to network element 100-2, the element 100-4 will use the route list contained in the SETUP message to pass the SETUP message to network element 100-3, as discussed above.

Figure 4A:
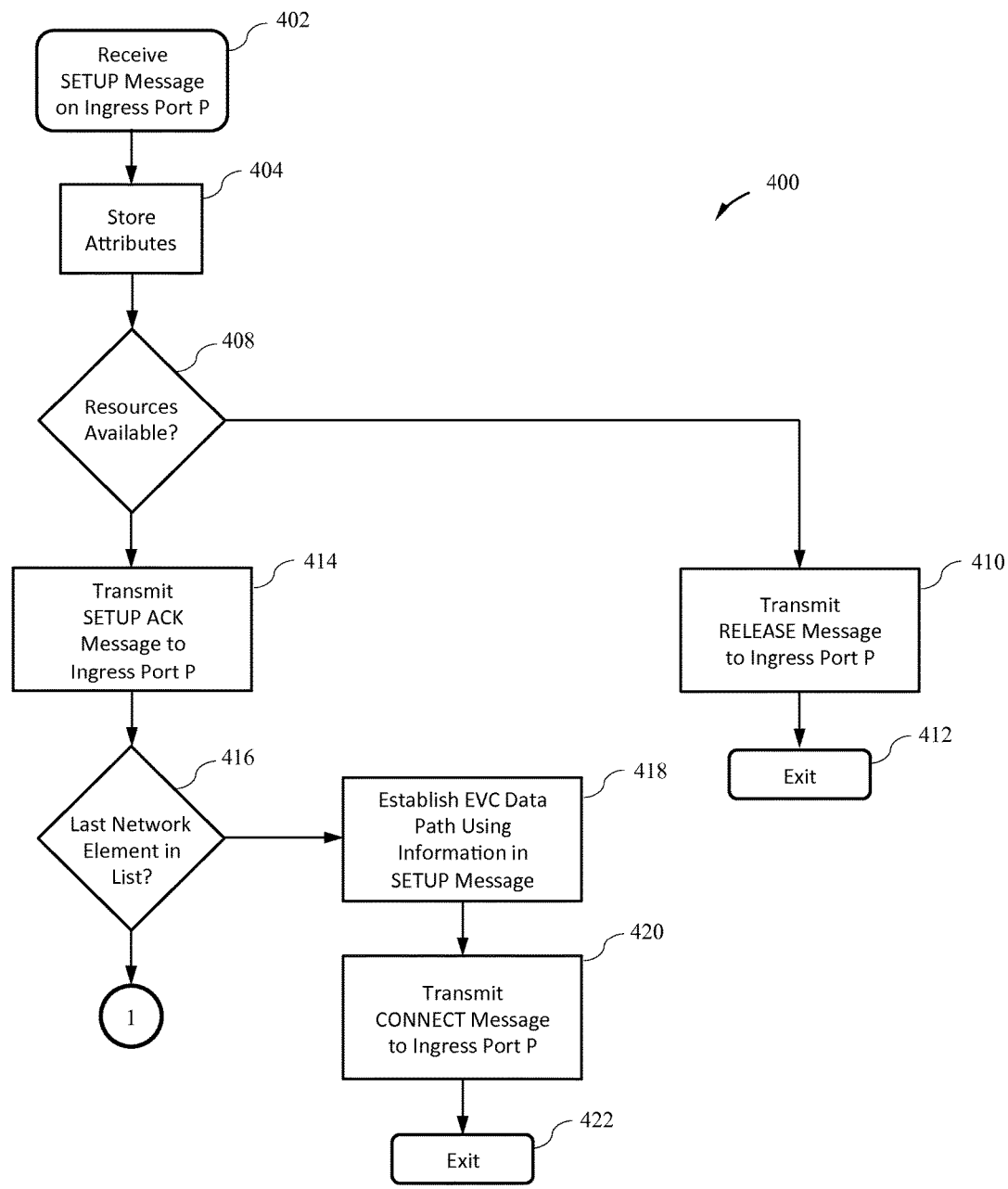
FIG. 4A is a first portion of a block diagram illustrating an exemplary method, in accordance with certain aspects of this disclosure.
Figure 4B:
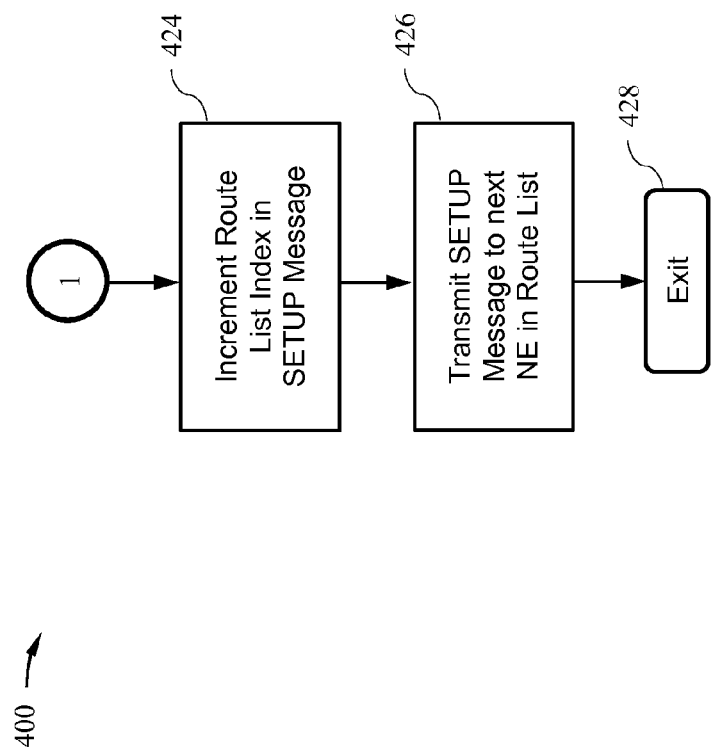
FIG. 4B is a second portion of the block diagram of FIG. 4A.

Turning to FIGS. 4A and 4B, a flow diagram 400 depicting a method of establishing a point-to-point bi-directional EVC on a network will be described in greater detail. For illustration purposes, the flow diagrams of FIGS. 4A and 4B will be described with respect to the network infrastructure 300A of FIG. 3A. Various failures may occur during the steps of the method of FIGS. 4A and 4B, as described in the discussion of the method below, however many of these failure modes, while discussed, are not specifically depicted for purposes of simplicity. Each of these failures may be handled in a similar way, for example releasing exemplary resources as discussed in greater detail below. The source network element, e.g. network element 100-1 of network infrastructure 300A of FIG. 3A, may then attempt to reinitiate the EVC setup, after a specified timeout period for example.

The flow diagram 400 of FIGS. 4A and 4B is performed at each of the network elements 100 downstream from the source network element 100-1, for example network elements 100-2 and 100-3 of the network infrastructure 300A. A first portion of the flow diagram 400 is depicted in FIG. 4A, while a second portion of the flow diagram 400 is depicted in FIG. 4B. The SETUP message is transmitted from a port of the source network element 100-1 to a port of the network element 100-2, and with a specified S-VLAN identifier received on a particular ingress port 106. The SETUP message includes a route list, e.g. an ordered list of the network elements 100, as well as attributes related to the ports of the network elements 100 to further define the inter-network element 100 connections or links, which may be derived from the discovery process, as discussed above. Such attributes may be stored in memory local to each of the network elements 100. The route list includes a sequential list of network elements 100 from the source network element 100-1 to the destination network element 100-3 and an index to the current route list entry, e.g., the next network element 100 along the path toward the destination network element 100-3. Initially, the index may be set to point to the first downstream network element 100 from the source network element 100-1, e.g., network element 100-2.

The network element 100-2 receives the SETUP message on an ingress port P of the network element 100-2 in a step 402. The network element 100-2 stores the associated attributes of the SETUP message in local memory in a step 404. For example, the connection ID and S-VLAN designation, as part of the SETUP message attributes, may be stored and associated with the ports 106 of the network element 100-2 such that future transmissions associated with establishing the EVC or transmission of data traffic after the EVC has been established may be readily switched through the element 100-2. A determination is made in a step 408 whether resources are available in the network element 100-2 necessary for the creation of the EVC. Such resources may include available ports 106 having sufficient bandwidth between network elements 100-2 and 100-3, for example. If adequate resources are not available for establishing the EVC, a RELEASE message is transmitted back to the upstream network element 100-1 over the ingress port on which the SETUP message was received, e.g., port P of network element 100-2, in a step 410. The RELEASE message may include attributes which identify the EVC, thus upon receiving a RELEASE message from the network element 100-2, the source network element 100-1 may first release its resources associated with the EVC and then periodically attempt to reestablish the EVC, at various time intervals for example. The method is then exited in a step 412.

Figure 4C:
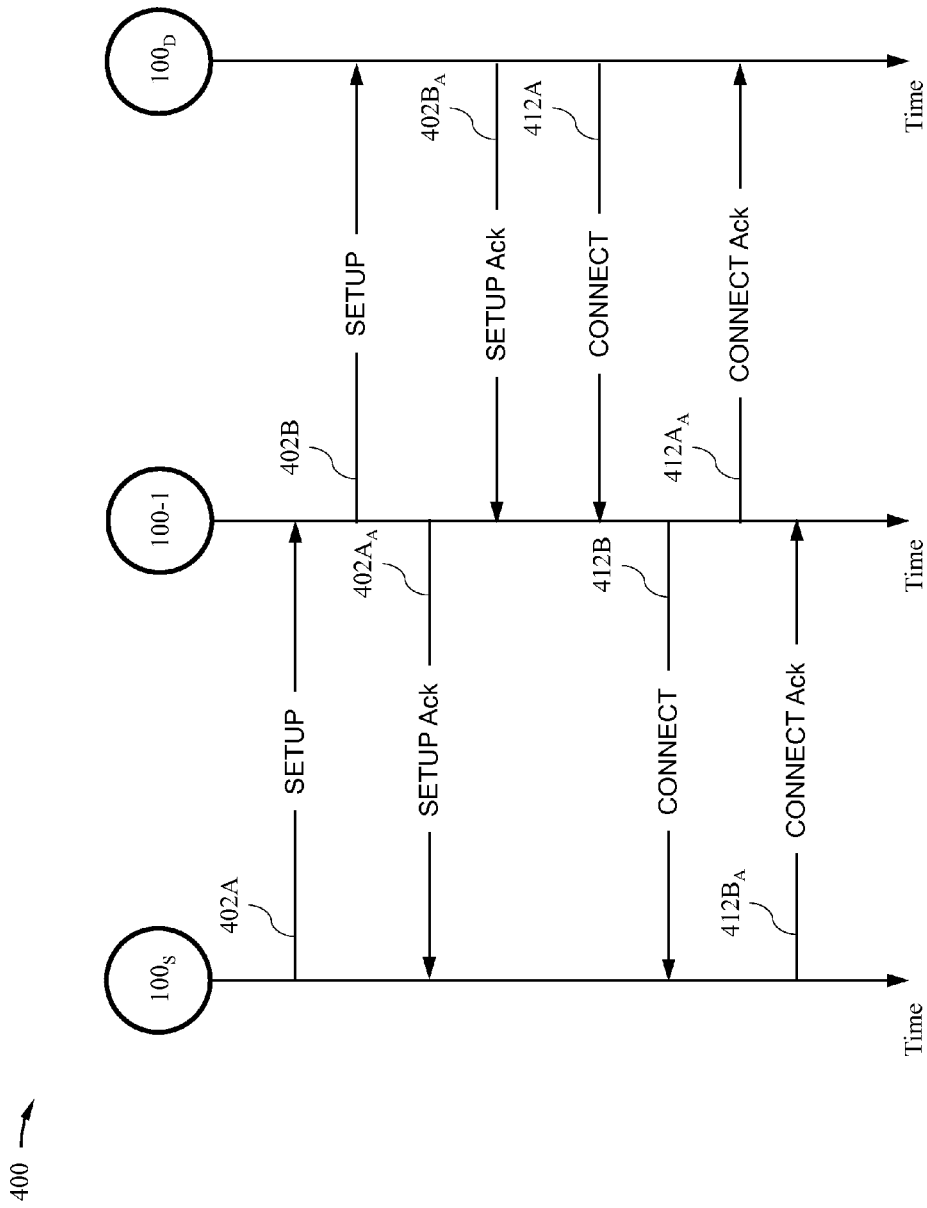
FIG. 4C is a chart depicting certain messages transmitted in accordance with the exemplary method of FIGS. 4A and 4B.

If adequate resources exist in network element 100-2 to establish the EVC, a SETUP Acknowledgement or SETUP ACK is transmitted back through the ingress port P of the network element 100-2 to the upstream network element 100-1 in a step 414, as describe in greater detail with respect to FIG. 4C below. The SETUP ACK may include a S-VLAN ID designated by the network element 100-2 associated with the link establish between the network elements 100-1 and 100-2. An inquiry whether the current network element, e.g. network element 100-2, is the destination network element is performed in a step 416. For example, if an index of the route list points to the last network element entry of the route list, then the current network element must be the destination network element. Alternatively, the network element 100-2 could compare the destination network element ID with its network element ID and if they match it would be deemed the destination network element.

Since the current network element is network element 100-2 and the route list contains an additional entry, namely network element 100-3, the route list index is incremented to point to the next network element in a step 424 of the second portion of the flow diagram 400 depicted with reference to FIG. 4B. The SETUP message is then transmitted downstream to the next network element in a step 426, e.g., network element 100-3, and the method, as performed by network element 100-2, is exited in a step 428.

The exemplary method of FIGS. 4A and 4B will now be discussed relative to network element 100-3. The SETUP message transmitted from the network element 100-2 would be received on an ingress port P associated with the network element 100-3 in the step 402. Attributes associated with the EVC are stored in the step 404, as described in greater detail above with respect to the network element 100-2. If adequate resource are not available to support the EVC, the network element would transmit a RELEASE message back to the network node 100-2 on the ingress port P of the network element 100-3 in the step 410. As described above with respect to network element 100-2, network element 100-2, which receives the message from network element 100-3, would release resources associated with the EVC, e.g., the port and S-VLAN designations which may be utilized for network element 100-2 of the EVC, making these resources available for use in the establishment of the same or a new EVC. The RELEASE message is then provided to the source network element 100-1 using the previously established link associated with the EVC and network elements 100-1 and 100-2. Upon receiving a RELEASE message from the network element 100-2, the source network element 100-1 may first release its resources associated with the EVC and then periodically attempt to reestablish the EVC, at various time intervals for example. The method is then exited in the step 412.

If sufficient resources exist in network element 100-3 to support the EVN, a SETUP ACK message is then transmitted back to the downstream network element 100-2 in the step 414. Since the route list index is pointing to the last network element in the route list, the network element 100-3 determines it is indeed the destination network element 100-3 in the step 416. The EVC data path is then established using the information in the SETUP message, for example physically connecting the client network element, e.g., Client$_2$, to the EVC in a step 418. The destination network element 100-3 then returns a CONNECT message back over the EVC in a step 420, e.g., out the ingress port P of the network element 100-3, to the network element 100-2 to indicate that the EVC has been established. The CONNECT message, as well as associated acknowledgement messages then propagate over the EVC, as described in greater detail below with reference to FIG. 4C. At the network element 100-2, the CONNECT message is received and a data path connection is established in accordance with the stored attributes related to the SETUP message. At this point the EVC is established and provides data traffic communication between Client$_1$ to Client$_2$. The method with respect to network element 100-3 and as depicted in the flow chart of FIG. 4A is exited in a step 422.

The establishment of the EVC can fail for numerous reasons, aside from what was mentioned above. Upon failure, the resources associated with the EVC may be released, as discussed above with respect to the step 410. A link between two of the network elements 100 along the path may fail, for example, a link defined by path P$_1$ from the source network element 100-1 and the network element 100-2 of the network 300A of FIG. 3A may fail, have a Loss of Signal condition, or may be inadvertently configured down. Another source of a possible failure may be the failure of a network element 100 to response to a received SETUP message, in the instance where the network element 100 is down, temporarily or permanently. There may be insufficient bandwidth available on one of the ports of one or more network elements 100 as part of the EVC, or if the bandwidth of the destination network element 100-3 does not match the source network element 100-1. The EVC may also fail if no available S-VLAN IDs exist or the source network element 100-1 is deleted by configuration during the EVC setup.

Once the EVC setup is complete and data traffic is provided from a first client network element, e.g. $Client_1$, to a second client network element, e.g. $Client_2$, over the EVC, various EVC resources may then be maintained or managed. Such EVC resources include, but are not limited to, bandwidth, physical connectivity in the Ethernet switch, e.g. switch 112, of each network element 100, and the associated S-VLAN ID. Each network element 100 may maintain available bandwidth in each direction on each of it associated network ports, e.g., ports 106. For example, available bandwidth may be determined by multiplying the network port capacity, e.g., 10 GBits/Sec, by an overbooking factor to provide some variable overhead, if desired, minus the bandwidth in the corresponding direction of all the EVCs which utilize the port 106. When the SETUP message is received on an ingress port of a network element 100, the network element 100 may determine whether the bandwidth specified within the SETUP message is available on the specified port. Such a determination may be provided separately for both ingress and egress directions on the port. If insufficient bandwidth exists on the designated port, the network element 100 may respond to the SETUP message with an acknowledgment indicating that insufficient bandwidth exists for the specified port. If sufficient bandwidth exists on the designated port, then the SETUP message may be forwarded, as described above, and the available bandwidth of the specified port in the specified direction is decremented by the amount specified in the SETUP message and required for the EVC setup. Conversely, when the EVC fails, or is otherwise deconstructed, the resources associated with the EVC setup are released, as discussed above, and the bandwidth associated with the EVC is incremented back to the network element 100 specified port 106.

A second managed resource of the EVC setup is the physical connection through the Ethernet switch of each network element 100. The bi-directional connection associated with the EVC setup is established in the Ethernet switch, upon handling of the CONNECT message, as described above with respect to the method of FIG. 4A. For each of the transitional network elements, e.g., network element 100-2, which are positioned along the EVC route, the bi-directional connections include an association between the ingress port, egress port, and S-VLAN designations. For the source network element 100-1 and the destination network element 100-3, the bi-directional connection includes of an association between the access ports $AP_1$, $AP_2$, e.g., connected to the client network elements $Client_1$, $Client_2$, and the S-VLAN on the network port of the corresponding element 100-1, 100-3. Upon release of the EVC, the bi-directional connection is released in the ethernet switch upon receipt of the RELEASE message or PDU which is received or sent.

Another managed resource related to the EVC setup is related to the S-VLAN ID. Each network element 100 which receives the SETUP message selects an available S-VLAN ID, and informs the network element 100 which transmitted the SETUP message of the selected S-VLAN ID, for example in an acknowledgement message as described in greater detail with respect to FIG. 4B below. The network element 100 which transmitted the SETUP message uses the S-VLAN translation on its egress port to map the S-VLAN ID it is already using for the current EVC to the S-VLAN ID received from the network element 100 which received the SETUP message.

Turning to FIG. 4B, acknowledgement messages associated with the SETUP, CONNECT, and RELEASE messages will be described in greater detail. In general, each time a SETUP, CONNECT or RELEASE message is transmitted to an adjacent network element 100, an acknowledgement message or Ack is returned in response to the received message. As stated above, since the messages are transmitted via Ethernet on layer-2 or the OSI model, the Ack messages provide adequate feedback that the sent message was received. FIG. 4B depicts the transmission of certain messages in accordance with the flow chart of FIG. 4A, and with respect to the three network elements 100-1, 100-2, 100-3 of the EVC of FIG. 3A over time.

Initially, a SETUP message is sent from the source network element 100-1 to the network element 100-2 per step 402 of FIG. 4A, as indicated by arrow 402A and as described above with respect to FIG. 4A. Since the network element 100-2 is not the destination network element, the SETUP message is forwarded to the next network element in the route list, network element 100-3, as indicated by arrow 402B. The network element 100-2 also, sends an SETUP acknowledgment or SETUP Ack message back to the network element 100-1 to acknowledge receipt of the SETUP message therefrom, as indicated by arrow $402A_A$. The SETUP Ack message may also include S-VLAN designations associated with the link between network element 100-1 and network element 100-2, as well as other attributes associated with the EVC, if desired. If the SETUP Ack message is not timely received the network element 100-1 may retransmit the SETUP message. After a number of retransmissions, the network element 100-1 may notify a network administrator of the failure in the link, or may try to establish the EVC on another link, if available. Similarly, the destination network element 100-3 transmits a SETUP Ack message back to network element 100-2 to acknowledge receipt of the SETUP message, as well as transmit other attributes associated with the EVC, as indicated by the arrow $402B_A$.

Once destination network element 100-3 determines it is the destination network element for the EVC it transmits a CONNECT message back along the EVC, e.g., to network element 100-1 per step 412 of FIG. 4A, as indicated by arrow 412A of FIG. 4B. Once received, network element 100-2 transmits the CONNECT message to the source network element 100-1, as indicated by arrow 412B. Also, network element 100-2 transmits a CONNECT Ack message back to the destination network element 100-3 to provide an indication that the CONNECT message was received, as indicated by the arrow $412A_A$. Similarly, the source network element 100-1 transmits a CONNECT Ack message to the network element 100-2 to provide an indication that the CONNECT message was received, as indicated by the arrow $412B_A$. While RELEASE messages are not depicted in the chart of FIG. 4B, such messages between network elements 100 would include corresponding RELEASE Ack messages to ensure that the RELEASE messages are properly received.

Figure 5:
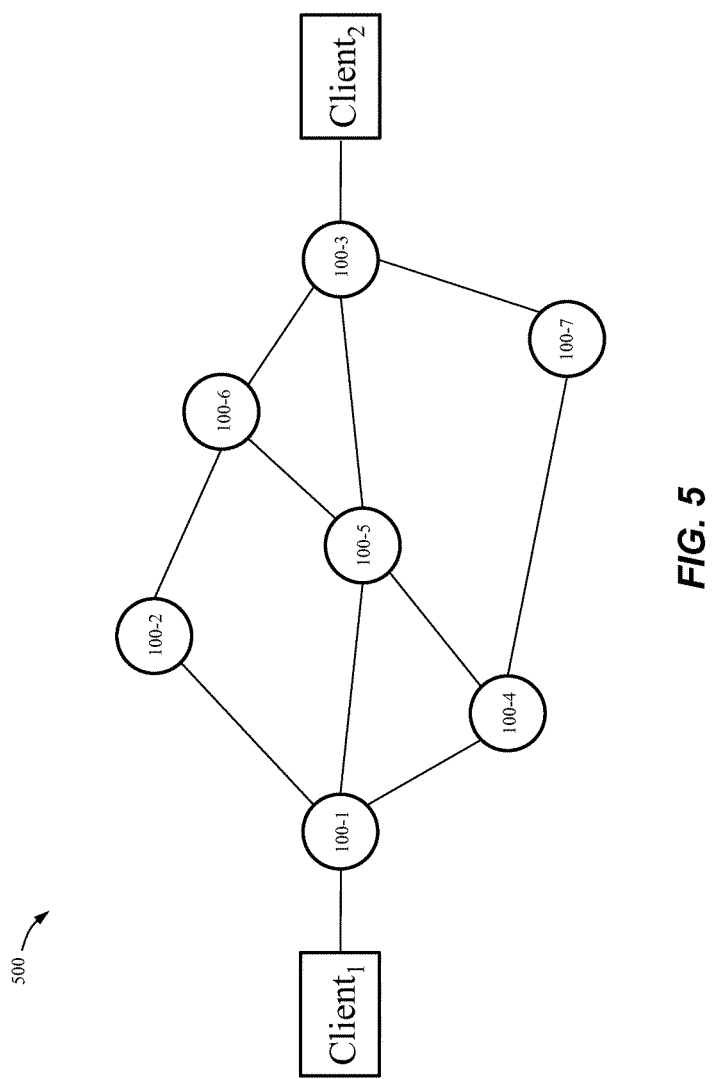
FIG. 5 depicts yet another network infrastructure, in accordance with certain aspects of this disclosure.

Turning to FIG. 5, the systems and methods of the present disclosure may be applied to more complex network infrastructures, e.g., a network of arbitrary topology. Network infrastructure 500 includes a source network element 100-1, a destination network element 100-3, and a number of network elements 100-1 through 100-5 interconnected in such a manner as to define multiple paths between the source and destination network elements 100-1, 100-3. Per the discovery process, as described in more detail above with respect to the network infrastructure of FIG. 3A, a representation of a route between the source and destination network elements 100-1, 100-3 may be defined. Once the route defined, an EVC between the network elements 100-1, 100-3 may be established as described herein. As an alternative, the network operator may specify an explicit route for the EVC, by entering configuration data in network element 100-1

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method, comprising:
configuring each of a plurality of network elements in accordance with a corresponding one of a plurality of sets of attributes, such that a first one of the plurality of sets of attributes constitutes a first set of attributes and a second one of the plurality of sets of attributes constitutes a second set of attributes, the first set of attributes being associated with a first one of the plurality of network elements and the second set of attributes being associated with a second one of the plurality of network elements, the first and second sets of attributes indicating a connection between the first and second ones of the plurality of network elements;
transmitting a first message that is a SETUP message in accordance with an Ethernet protocol from the first one of the plurality of network elements through each of remaining ones of the plurality of network elements to the second one of the plurality of network elements on a single layer in an Open Systems Interconnection (OSI) model, the single layer being layer 2 in the OSI model, the first message including an identifier that identifies the second of the plurality of network elements;
receiving the first message at the second of the plurality of network elements, the second of the plurality of network elements configured to compare the identifier with an attribute included in the second set of attributes; and
transmitting a second message in accordance with the Ethernet protocol from the second one of the plurality of network elements, through each of the remaining ones of the plurality of network elements, to the first one of the plurality of network elements, the second message being indicative of the connection being established between the first and second of the plurality of network elements.

2. The method of claim 1, wherein the identifier is one of a plurality of network element identifiers, each of the plurality of sets of attributes includes a corresponding one of the plurality of network element identifiers.

3. The method of claim 1, wherein a third one of the plurality of sets of attributes is associated with a third one of the plurality of network elements, first attributes in the third one of the plurality of sets of attributes identifying corresponding ones of the plurality of network elements adjacent to the third one of the plurality of network elements.

4. The method of claim 1, wherein the first one of the plurality of network elements includes a first access port configured to communicate with a first client network element, and the second one of the plurality of network elements includes a second access port configured to communicate with a second client network element, the connection terminating at the first and second access ports.

5. The method of claim 4, wherein the first set of attributes includes one or more of a connection identifier, a first shelf identifier associated with the first access port, a first slot identifier associated with the first access port, a first access port identifier which identifies the first access port, bandwidth parameters associated with the connection and attributes associated with the second one of the plurality of network elements.

6. The method of claim 5, wherein the second set of attributes includes one or more of a connection identifier, a second shelf identifier associated with the second access port, a second slot identifier associated with the second access port, a second access port identifier which identifies the second access port, and bandwidth parameters associated with the connection.

7. The method of claim 6, wherein the bandwidth parameters associated with the connection include one or more of a Committed Information Rate (CIR), a Committed Burst Size (CBS), an Excess Information Rate (EIR), and an Excess Burst Size (EBS).

8. The method of claim 1, wherein the plurality of network elements are included in a network, the network having a linear topology.

9. The method of claim 1, wherein the plurality of network elements are included in a network, the network having a ring topology.

10. The method of claim 1, wherein the connection is an Ethernet Virtual Connection.

11. The method of claim 10, wherein the connection is a bi-directional connection.

12. The method of claim 1, wherein the identifier of the second of the plurality of network elements is a network element ID.

13. The method of claim 1, wherein the identifier of the second of the plurality of network elements is a connection ID.

14. A system, comprising:
a plurality of network elements, each including a corresponding one of a plurality of sets of attributes, such that a first one of the plurality of sets of attributes constitutes a first set of attributes and a second one of the plurality of sets of attributes constitutes a second set of attributes, the first set of attributes being associated with a first one of the plurality of network elements and the second set of attributes being associated with a second one of the plurality of network elements, the first and second sets of attributes indicating a connection between the first and second ones of the plurality of network elements,
wherein the first of the plurality of network elements is configured to transmit a first message that is a SETUP message in accordance with an Ethernet protocol from the first one of the plurality of network elements through each of remaining ones of the plurality of network elements to the second one of the plurality of network elements on a single layer in an Open Systems Interconnection (OSI) model, the single layer being layer 2 in the OSI model, the first message including an identifier that identifies the second of the plurality of network elements, the second of the plurality of network elements configured to compare the identifier of the first message with an attribute includes in the second set of attributes and transmit a second message in accordance with the Ethernet protocol from the second one of the plurality of network elements, through each of the remaining ones of the plurality of network elements, to the first one of the plurality of network elements, the second message being indicative of the connection being established between the first and second of the plurality of network elements.

15. The system of claim 14, wherein the identifier is one of a plurality of network element identifiers, each of the plurality of sets of attributes includes a corresponding one of the plurality of network element identifiers.

16. The system of claim 14, wherein a third one of the plurality of sets of attributes is associated with a third one of the plurality of network elements, first attributes in the third one of the plurality of sets of attributes identifying corresponding ones of the plurality of network elements adjacent to the third one of the plurality of network elements.

17. The system of claim 14, wherein the first one of the plurality of network elements includes a first access port configured to communicate with a first client network element, and the second one of the plurality of network elements includes a second access port configured to communicate with a second client network element, the connection terminating at the first and second access ports.

18. The system of claim 17, wherein the first set of attributes includes one or more of a connection identifier, a first shelf identifier associated with the first access port, a first slot identifier associated with the first access port, a first access port identifier which identifies the first access port, bandwidth parameters associated with the connection and attributes associated with the second one of the plurality of network elements.

19. The system of claim 18, wherein the second set of attributes includes one or more of a connection identifier, a second shelf identifier associated with the second access port, a second slot identifier associated with the second access port, a second access port identifier which identifies the second access port, and bandwidth parameters associated with the connection.

20. The system of claim 19, wherein the bandwidth parameters associated with the connection include one or more of a Committed Information Rate (CIR), a Committed Burst Size (CBS), an Excess Information Rate (EIR), and an Excess Burst Size (EBS).

21. The system of claim 15, wherein the plurality of network elements are included in a network, the network having a linear topology.

22. The system of claim 15, wherein the plurality of network elements are included in a network, the network having a ring topology.

23. The system of claim 15, wherein the connection is an Ethernet Virtual Connection.

24. The system of claim 23, wherein the connection is a bi-directional connection.

25. The system of claim 15, wherein the identifier of the second of the plurality of network elements is a network element ID.

26. The system of claim 15, wherein the identifier of the second of the plurality of network elements is a connection ID.

27. A method, comprising:
configuring each of a plurality of network elements in accordance with a corresponding one of a plurality of sets of attributes, such that a first one of the plurality of sets of attributes constitutes a first set of attributes and a second one of the plurality of sets of attributes constitutes a second set of attributes, the first set of attributes being associated with a first one of the plurality of network elements and the second set of attributes being associated with a second one of the plurality of network elements, the first and second sets of attributes indicating an Ethernet Virtual Circuit between the first and second ones of the plurality of network elements;
transmitting a first message that is a SETUP message in accordance with a protocol associated with a single layer of an Open Systems Interconnection (OSI) model, the single layer being layer 2 in the OSI model, from the first one of the plurality of network elements through each of remaining ones of the plurality of network elements to the second one of the plurality of network elements, the first message including an identifier that identifies the second of the plurality of network elements;
receiving the first message at the second of the plurality of network elements, the second of the plurality of network elements configured to compare the identifier with an attribute included in the second set of attributes; and
transmitting a second message in accordance with the protocol from the second one of the plurality of network elements, through each of the remaining ones of the plurality of network elements, to the first one of the plurality of network elements, the second message being indicative of the connection being established between the first and second of the plurality of network elements.

28. The method of claim 27, wherein the protocol is an Ethernet protocol.

29. The method of claim 27, wherein said remaining ones of the plurality of network elements includes a third and a fourth of the plurality of network elements, the step of transmitting the first message includes transmitting the first message from the first of the plurality of network elements to the third of the plurality of network elements with a first S-VLAN designation, and transmitting the first message from the fourth of the plurality of network elements to the second of the plurality of network elements with a second S-VLAN designation different from the first S-VLAN designation.

* * * * *